April 17, 1934.   V. AVERIN   1,954,793
HYDRAULIC TRANSMISSION
Filed Sept. 10, 1932   5 Sheets-Sheet 3
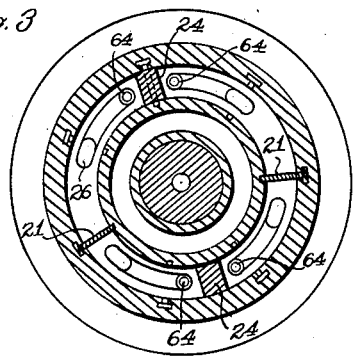
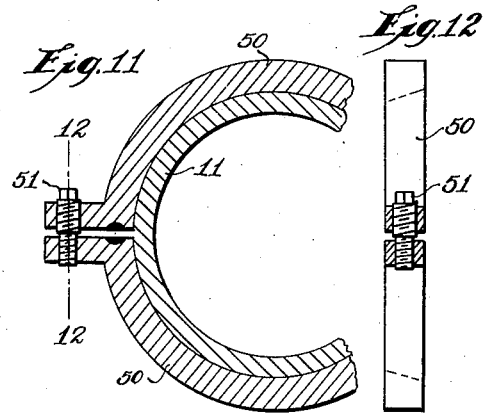
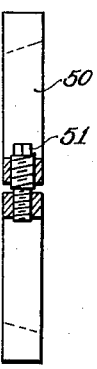
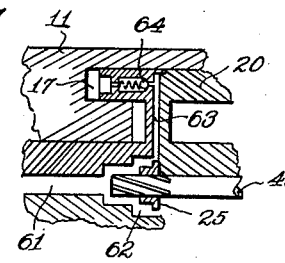
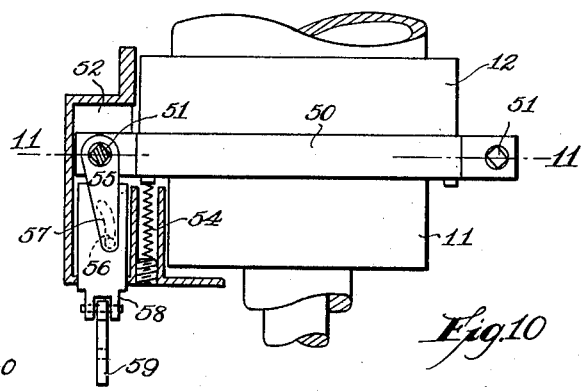
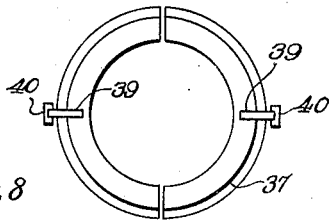
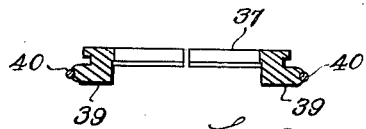
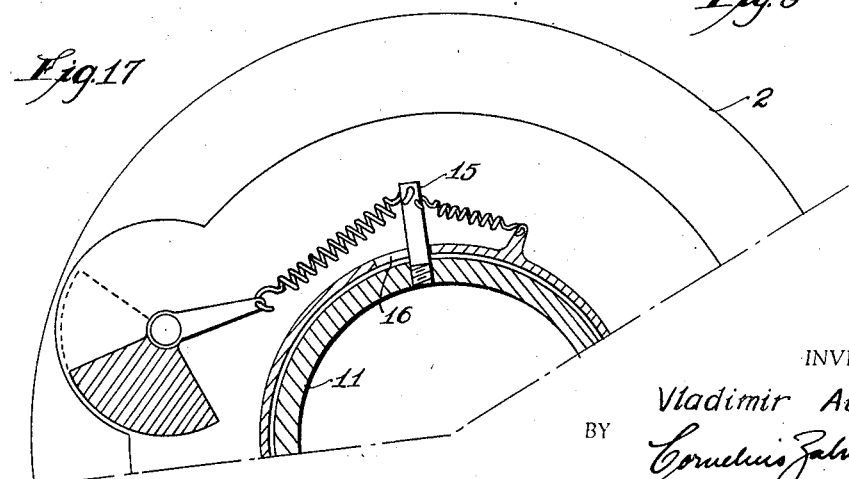
INVENTOR.
Vladimir Averin
BY
ATTORNEY.

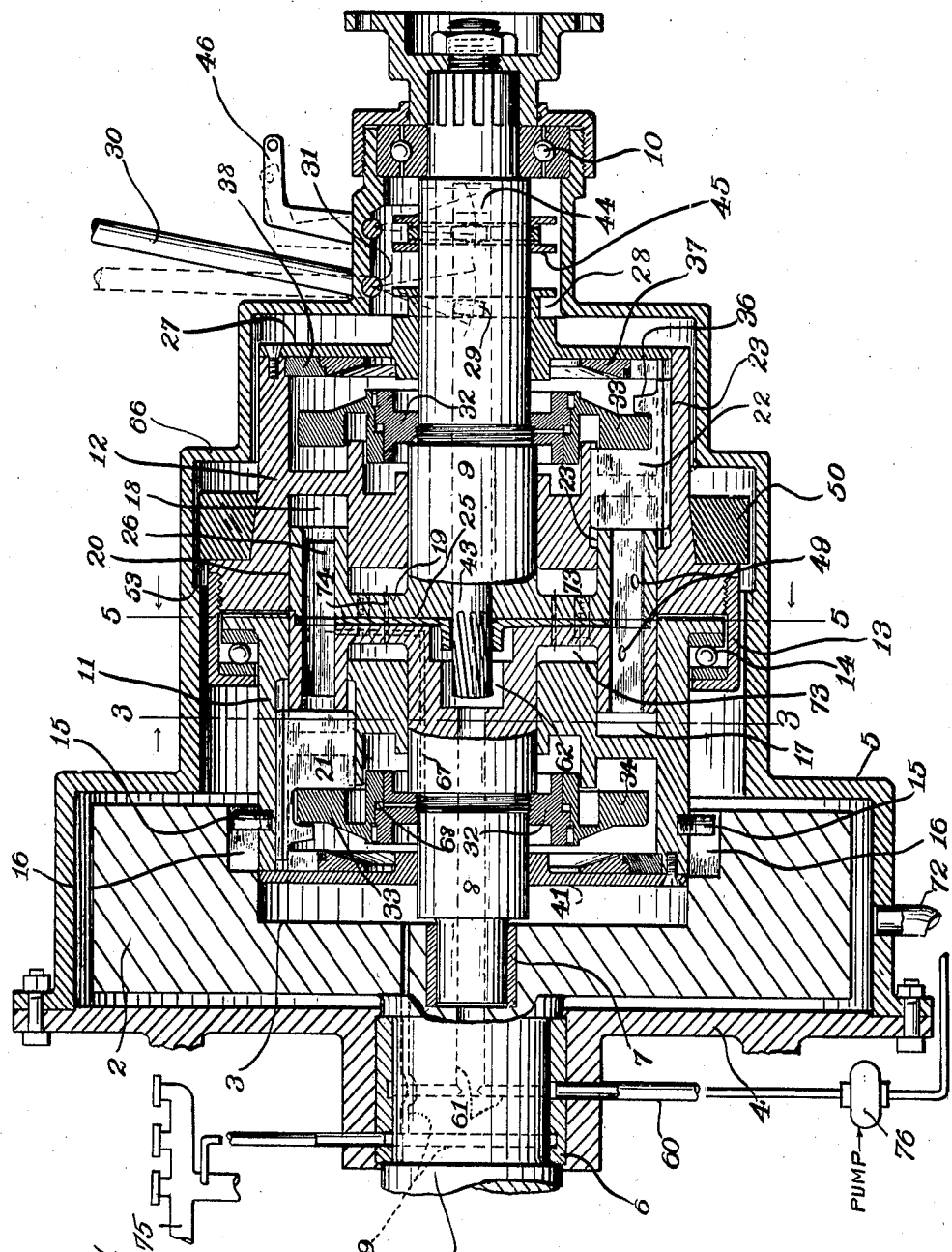

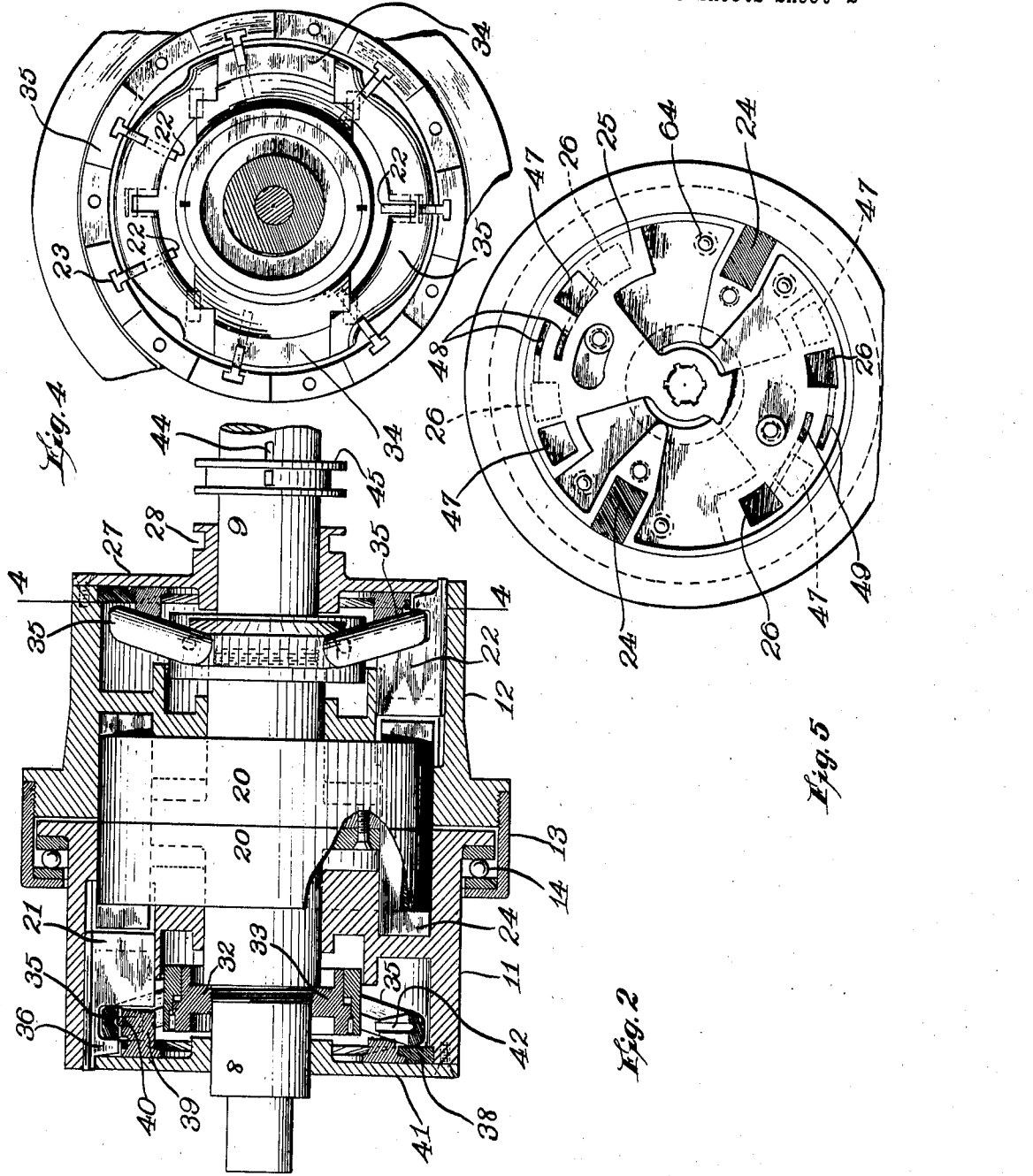
April 17, 1934.  V. AVERIN  1,954,793
HYDRAULIC TRANSMISSION
Filed Sept. 10, 1932  5 Sheets-Sheet 2
INVENTOR.
Vladimir Averin
BY
Cornelius Zabriskie
ATTORNEY.

April 17, 1934.  V. AVERIN  1,954,793
HYDRAULIC TRANSMISSION
Filed Sept. 10, 1932  5 Sheets-Sheet 4

INVENTOR.
Vladimir Averin
BY
Cornelius Zabriskie
ATTORNEY.

Patented Apr. 17, 1934

1,954,793

UNITED STATES PATENT OFFICE 1,954,793

HYDRAULIC TRANSMISSION

Vladimir Averin, New York, N. Y.

Application September 10, 1932, Serial No. 632,578

20 Claims. (Cl. 60—53)

This invention relates to hydraulic transmissions and is directed more particularly to improvements in this art whereby a more simple, economical and efficient structure may be obtained for the transmission of power with an infinite number of speed ratios and including a drive in reverse.

The invention relates primarily to that type of hydraulic transmission which utilizes in the main three distinct elements, more particularly a driving element, a reaction element and a driven element, the last of which is affixed to the shaft to be driven.

In accordance with this invention, the driving element and the reaction element are provided with opposed annular channels and between these elements is positioned a driven element in the form of a filler member projecting into the opposing channels of the two other elements and forming therewith closed annular chambers which are open to communication with one another through passages in the filler member. The driving and reaction members are provided with blades dividing said channels into a plurality of pockets and in accordance with the present invention, these vanes are cam operated in a positive manner. Variations in speed are obtained by a conjoint bodily shifting of the driving and reaction members in an axial direction and these two members are tied together in an axial direction in a manner to preclude their separation, but to permit of their relative rotation.

An important feature of the present invention resides in the provision of means for axially stabilizing the operations of the driving and reaction members to preclude axial vibration during the operation of the apparatus.

A further important feature resides in the inclusion of a valve associated with ducts or passages through the driven member and which valve is manually operable to selectively control the passage of liquid from one channel to the other to thereby control the direction of rotation of the driven shaft, whereby the said shaft may be driven in a forward or reverse direction without change of the direction of rotation of the driving shaft.

Another important feature of this invention resides in the incorporation into the construction of means for automatically adjusting power to load, whereby the apparatus will be automatically regulated to compensate for variations in load without the necessity of manual intervention.

A further feature of the present invention resides in means for controlling the rotation of the reaction member to thereby enable the transmission to be used for braking purposes and the manual control of said member which will permit of the release of the driven shaft to allow of its free rotation. The reaction member according to the present invention is mounted for rotation, but is provided with means for arresting such rotation and maintaining said member at rest at such times as it is desirable so to do.

Another feature of this invention is the automatic release of the reaction member for free rotation during conditions of direct drive and which minimizes friction and wear and results in the transmission of maximum power.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 is a central longitudinal vertical section through a transmission embodying the present invention.

Figure 2 is a like section of certain interior parts of the mechanism shown in Figure 1.

Figure 3 is a transverse section on the line 3—3 of Figure 1.

Figure 4 is an end view of the parts shown in Figure 2 with the cover and certain associated parts removed, so that this view is approximately a section on the line 4—4 of Figure 2.

Figure 5 is a section on the line 5—5 of Figure 1.

Figure 7 is a detail fragmental section showing the manner in which liquid is supplied to one of the channels of the transmission.

Figure 8 is a face view of a cam adjustment ring for controlling the position of the vanes.

Figure 9 is a cross section of said ring.

Figure 10 is a detailed showing of a slip ring entering into the construction and illustrating means for adjusting said ring automatically and at the will of the operator.

Figure 11 is a transverse section on the line 11—11 of Figure 10.

Figure 12 is a section on the line 12—12 of Figure 11.

Figure 17 shows centrifugal governor construction which may be used in the modified form of this invention.

Figures 6, 13:
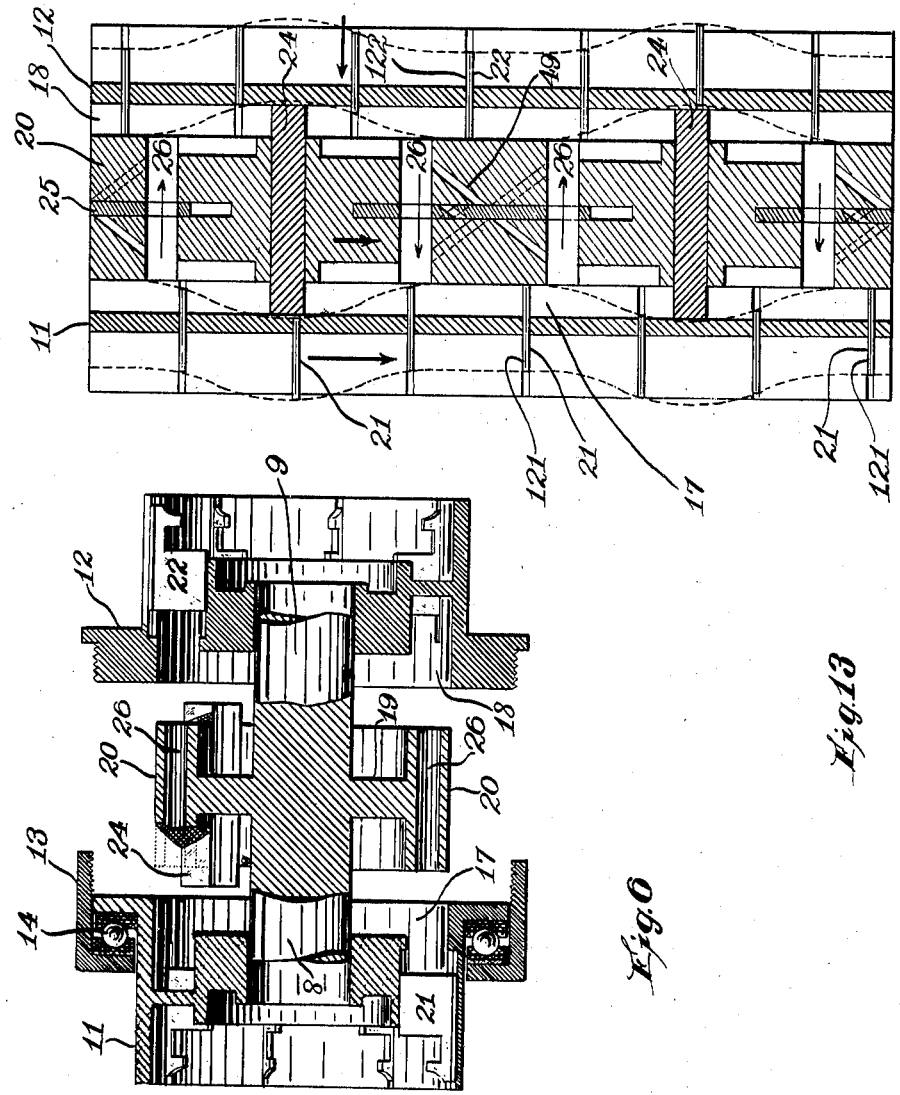
Figure 6 is a diagrammatic section of the mechanism shown in Figure 2 with certain parts removed and with other parts slightly separated from one another in the interest of clearness.
Figures 13, 14, 15 and 16 are diagrammatic views illustrating the mode of operation of the apparatus.

Referring to the drawings, 1 designates the prime mover of the transmission which, in practice, is in the form of a shaft adapted to be driven from any suitable source of power, such, for example, as that furnished by an internal combustion engine in which event the shaft 1 constitutes the crank shaft of the engine. "Prime mover", as used in this specification and the appended claims, may be defined as that part which puts the machine in motion and operates said machine. To the end of the shaft is affixed a fly wheel 2 shown as hollowed out or chambered at its center at 3.

The fly wheel and other associated parts of the transmission hereinafter to be described are enclosed within a housing comprising an end plate 4 and a demountable casing 5. The end plate 4 is provided therein with a bearing 6 for the shaft 1 as shown.

The fly wheel is provided axially with a bearing 7 for the forward end of a transmission shaft which, in the present embodiment of the invention is made in two sections, namely, a forward section 8 and a rear section 9. These sections, as hereinafter described, are bolted, riveted or otherwise secured together to operate as a unit with the forward end of the transmission shaft journalled in the bearing 7 and the after end of said shaft journalled in a bearing 10 which is preferably a ball or roller bearing mounted in the rear end of the casing 5. It is to be noted in this connection that the transmission shaft is adapted to rotate freely with respect to the fly wheel except when driven thereby through operative connections hereinafter more fully described. In other words, there is no direct or positive connection between the transmission shaft and the fly wheel.

Embracing the respective sections of the transmission shaft in coaxial relation thereto and free for rotation thereon are two relatively rotatable cylindrical members, the former of which 11 constitutes the driving member, and the latter of which 12 constitutes the reaction member. These members are maintained in substantially cross axial face abutting relation by means of an annular cage 13 enclosing an antifriction bearing 14, and both of said members bear upon the transmission shaft to rotate freely thereon or to permit the shaft to rotate freely with respect thereto. The driving member 11 derives its power through pins 15, which extend radially from said member into slots 16 in the cupped or chambered portion of the fly wheel. These slots may, if desired, extend parallel to the axis of the fly wheel, but by preference are extended, in the embodiment of the invention shown, in inclined or helical directions, so that as the fly wheel drives the driving member 11, it will have an ever-present tendency to shift the driving member in an axial rearward direction. As hereinafter described, however, this force is counteracted in an automatic manner to obtain an automatic regulation of the transmission in accordance with the load. Suffice it here to note that the fly wheel drives the driving member 11 at a speed equal to that of the fly wheel and through a positive and direct connection.

The two members 11 and 12 are provided in their contiguous cross axial faces with opposed annular channels 17 and 18 which channels are of uniform depth and radial width throughout.

The transmission shaft, however, carries at its center an annular filler section 20, which is mounted on the transmission shaft by means of an integral radial web 19; and this filler member extends oppositely in an axial direction into the respective channels 17 and 18. I find it convenient, in practice, and for reasons hereinafter more fully explained to divide the transmission shaft cross axially through the center of the filler member and its supporting web or flange and to thereafter secure these parts together so that they operate as a unit. Primarily the reason for doing this is to permit me to encase between the sections a reversing disk 25 which will be hereinafter more fully explained.

For all practical purposes, however, it will be understood that the filler member forms an integral part of the transmission shaft and operates as a unit therewith.

Each of the channels 17 and 18 of the driving and reaction members are divided circumferentially into a plurality of pockets by means of a number of blades. The blades of the channel 17 are designated generally by the reference character 21, while those of the channel 18 are designated generally by the reference character 22. These blades are each shaped at its longitudinal edges to cooperate with guides 23 in the member in which it is mounted and these guides extend through slots in the bases of the channels, which slots are shaped to permit the blades to move rectilinearly of the slots, so as to project for a greater or lesser distance into the respective channels.

In practice, the guides for the outer edges of the blades are preferably of T or dove-tail shaped cross section, so as to steady the operations of the blades. This type of guide, however, is not necessary for the inner edges of the blades, although it may be utilized if desired.

In practice, the filler member projects into the channels to a greater or lesser extent, as will hereinafter be described, while the remaining portion of the depth of the channels is occupied by the blades which extend to a greater or lesser degree as may be necessary to accomplish this result.

Each channel is circumferentially divided into isolated sections by means of so-called partition members or partitions 24; two such partitions being shown in the illustrative construction of the drawings, although these partitions may be of a greater or lesser number if desired. However, in the form shown, they are positioned diametrically apart with respect to one another and are in the form of substantially rectilinear bars which extend through and are guided for longitudinal movement in the filler member 20. The inner and outer surfaces of these bars 24 are curved to conform to the inner and outer circumferential walls of the channels and the bars are of such length as to extend longitudinally from the base of one channel 17 to the base of the other channel 18. Intermediate the partitions 24, the filler member is provided at spaced apart arcuate distances with straight through passages 26 which open communication between the respective channels, there being four of such passages shown and illustrated best in Figs. 1 and 3. Through these passages liquid may pass from one channel to the other in an unobstructed manner.

As hereinbefore stated, the driving member 11 and the reaction member 12 are mounted freely upon the transmission shaft for free rotation thereon and at the same time said members are capable of collective axial sliding movement on said shaft. They are collectively movable by virtue of the cage 13 and the antifriction bearing 14, so that when one is moved, the other is moved therewith.

It will be noted from Figure 1 that the reaction member 12 is provided with an end plate or covering plate 27 having a hub formed with a circumferential channel 28 and into this channel extends the fork 29 of a first class lever 30 pivoted at 31 to the casing. Through the manipulation of the lever, the hub of the end plate 27 is slid longitudinally of the transmission shaft and carries therewith the reaction member 12, and through the connection of the cage 13, the driving member 11. Through this movement of the driving and reaction members 11 and 12, manually obtained in the manner stated, the variation in effective depths of the respective channels 17 and 18 is obtained by causing the relatively stationary filler member to project to a greater extent into one channel than in the other, or vice versa. It will of course be manifest that as the depth of the respective channels is varied, the operative range of the blades must be correspondingly adjusted, and, accordingly, I control these blades by an adjustable cam arrangement next to be described.

Threaded on to the transmission shaft sections at the distant sides of the driving and reaction members are threaded seat rings 32. A threaded relation is shown, though in practice, these rings may be sweated into place or otherwise locked in position.

On each of these rings a cam member 33 is supported for axial adjustment within narrow limits, but at the same time is locked against relative rotation with respect to the transmission shaft. Both of these cam members are of the same construction and for the arrangement shown in the drawings, each cam member embodies two oppositely disposed stationary sections 34 of arcuate form and to the opposite ends of which are pivoted two oppositely disposed adjustable sections 35. The sections 34 and 35 collectively constitute a cam track, and each of the blades is provided at its rear end with a hook end 36 adapted to hook over and straddles the cam track after the manner shown best in Fig. 2. The stationary sections 34 of the cam track are adapted for slight automatic longitudinal adjustment to take up wear or to compensate for slight irregularities in machining, etc., but to all intents and purposes are stationary, whereas the adjustable sections 36 are adapted to be moved to various inclinations through the axial adjustment of the driving and reaction members. This is accomplished with respect to the cam track adjacent the reaction member by a ring 37 shown in Figs. 8 and 9. This ring 37 is split and it is mounted in position within an undercut guide 38 on the inner face of the end plate 27 and said ring is provided with integral brackets 39 which extend inwardly and underlie the adjustable cam sections 35 intermediate the ends thereof and are pivotally secured to said cam sections by means of trunnions 40, see Figs. 8, 9 and 2. The ring is split to permit the trunnion 40 to be engaged with the adjacent cam sections 35.

In Fig. 2, the connection between the ring 39 and the adjustable cam section is shown for the cam section adjacent the driving member, but the arrangement at both ends of the structure is the same, the driving member having an end plate 41 with an undercut guide 38. The bracket at the lower side of this view is broken away to show the slot 42 in the adjustable cam section which receives the trunnions 40.

With this arrangement, it will be noted that the end plates 27 and 41 are movable with the reaction and driving members, respectively, whereas the cams being mounted on the transmission shaft are rotatable with the shaft and carry with them the rings 37.

I have hereinbefore referred to the valve disk 22 which is positioned between the sections of the filler member and transmission shaft. This disk has a hub which is threaded on a long lead to a similarly threaded adjusting rod 43. The rod 43 extends through the right hand section 9 of the transmission shaft for a greater portion of the length of the latter, and near the rear end of said shaft, the shaft is slotted as shown at 44 in Figs. 1 and 2. The channeled slip collar 45 embraces the shaft section 9, and is pinned through the slot 44 to the rod 43, and said slip collar is engaged by the forked end of an operating lever 46, so that through the manipulations of this lever, the rod 43 can be moved longitudinally to produce rotary movement of the valve disk 25. This disk is provided with ports 47 adapted in one position of the disk to register with the straight through passages 26 of the filler member, and said disk is further provided with additional ports 48 adapted to register in another position of the disk with "reverse" passages 49 in the filler member and appropriate to operating the transmission in reverse as will be hereinafter more fully explained.

The part 50, shown in the drawings, and more particularly in Figs. 1, 10, 11 and 12, may be termed a slip ring. It is made in two sections fastened together with adjusting screws 51, different portions of the length of which are threaded on different pitches, so that through the rotation of these screws 51, the differential movement of the parts will result and the diameter of the ring may be adjusted within fine limits. The ring 50 has a frusto conical inner surface cooperating with a similarly formed portion of the reaction member, and the projecting portions of the ring through which the adjusting screws 51 are passed extend into pockets 52 formed in the opposite sides of the casing 5, as shown in Fig. 10, so as to secure this slip ring against rotation, but to permit the ring to move axially with the reaction member within fixed limits. For example, if the reaction member is moved to the left in Fig. 1, the ring 50 will move with it until the ring engages a shoulder 53, whereupon the movement of the ring is arrested while the reaction member may continue to move to the left. The result of this operation will be hereinafter more fully explained. It may be noted, however, that the ring 50 is normally impelled in a direction to frictionally engage the frusto conical faces of the cooperating parts by means of springs 54, as shown in Fig. 10. The adjustment of the screws 51 or at least one of them is accomplished according to the specific embodiment of the invention shown by means of a wrench 55, shown in Fig. 10 as provided with a pin 56 working in a slot 57 of a slide 58.

The slide 58 is fixed to a lever 59. This lever is normally stationary, so as to hold and lock the slide 58 in the position shown, so that when the reaction member 12 moves to the left in Fig. 1 or upwardly in Fig. 10, the pin 56 will ride in a slot 57 which is slightly inclined, so that just prior to the time when the ring 50 engages the abutment 53 (Fig. 1) the ring will be loosened sufficiently to have practically no friction with the reaction member. However, by the time the ring 50 has engaged with the abutment 53 (Fig. 1), further movement of the reaction member to the left in this figure will result in clearance between said member and the ring, so that the reaction member may freely rotate for the purposes presently to be described.

Having described the elements entering into the construction of my transmission, I will now describe the mode of operation of these parts.

A suitable mobile liquid, such, for example, as oil is adapted to be introduced through an inlet pipe 60 (Fig. 1) and flows through passages 61 in shafts 1 and 8 into the chamber 62 from whence it passes through a passage 63, see Fig. 7, and through an inlet valve 64 in the filler member to enter the annular channel 17.

If it be assumed that the driving and reaction members are in the position shown in Fig. 1, and that this position is approximately that wherein the channels 17 and 18 will have the same effective depth, then the parts will have the relation substantially as diagrammatically shown in Fig. 13.

To operate in a forward direction, the disk valve 22 should be in the position indicated in Fig. 13, i. e. in a position to open the straight through passages 26 and to close the reverse passages 49. By reference now to Figs. 1 and 13, it will be noted that the power transmitted through the shaft 1, will drive the driving member 11 in the direction of the arrow in Fig. 13 carrying with it the blades 21.

In Fig. 13, the space between the parts 11 and 20 corresponds to the channel 17, while the space between the filler 20 and the reaction member 12 corresponds to the channel 18. The channel 17 is filled with motive fluid as stated, the driving member 11 is moving in the direction of the arrow, the filler member 20 is initially at rest, and the reaction member 12 is held against rotation by the slip ring 50. With this condition of facts, the movement of the blades 21, which are here specifically described as 121, will be tending to compress the motive fluid between itself and the next forwardly adjacent partition 24, these particular blades at this time cooperating with the stationary portion 33 of the cam. The liquid which it is thus attempted to compress is caused to flow from the pocket between the active vanes and said partitions through the straight through passages 26 into the pocket of the channel 18 between the corresponding partition 24 and the blade 122. This will cause a reaction against the stationary blade 122 with consequent movement of the partition 24 and resulting rotation of the filler member.

If the effective depths of the channels 17 and 18 are the same, the rotary movement of the filler member resulting from this operation will be approximately one-half the speed of the driving member and in this rotation the filler piece becomes the driven element and serves to impart rotation to the transmission shaft at a speed substantially one-half the speed of the fly wheel. As the driving member 11 continues to rotate in Fig. 13, and the blades 121 approach the partitions 24, said blades are retracted by the adjustable portions 35 of the cooperating cam track, so as to pass by the partitions in paths of travel indicated in dotted lines in this figure, but as each pair of effective blades 121 cease to be effective, the next following blades take effect and all of the blades thus act in succession to produce a steady flow of power at substantially one half the speed as stated. If, however, a greater speed is desired, the operating lever 30 may be moved to shift the driving and reaction members to the left, thus increasing the capacity of the channel 17 and decreasing the capacity of the channel 18 with consequent increase and decrease in the volume of the effective pockets. As a result, the receiving pockets are of considerably smaller volume than the discharging pockets and consequently the reaction is lesser with corresponding greater speed of the driven member.

Figure 14:
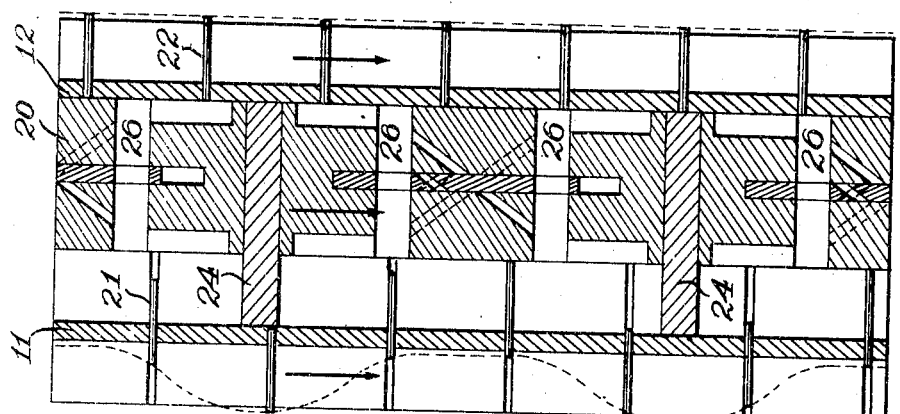

Assuming, however, that the driving and reaction members are moved to the extreme left in Fig. 1, a condition will then be brought about corresponding to Fig. 14, where the operative depth of the channel 17 is at its maximum, while the filler member extends to substantially the full depth of the channel 18. When the driving member attempts to force motive fluid through the by-pass into the channel 18, this channel has no effective volume and consequently the full force of the pressure applied is directed against the partitions 24 and the filler piece, i. e., the driven member is rotated at substantially the same speed as the driving member.

This constitutes in effect a direct drive to the transmission shaft and in order to minimize friction and deliver a maximum power, it becomes desirable under this condition to release the reaction member from the slip ring 50. This has been accomplished in the example given automatically by the act of moving the driving and reaction members to the limit of their travel in the direction of the left in Fig. 1, for during this travel the slip ring has been engaged with the abutment 53 and clearance has resulted between the slip ring and said reaction member. As a result, the fly wheel, driving member, driven member and reaction member rotate as a unit in the direct drive.

Figure 15:
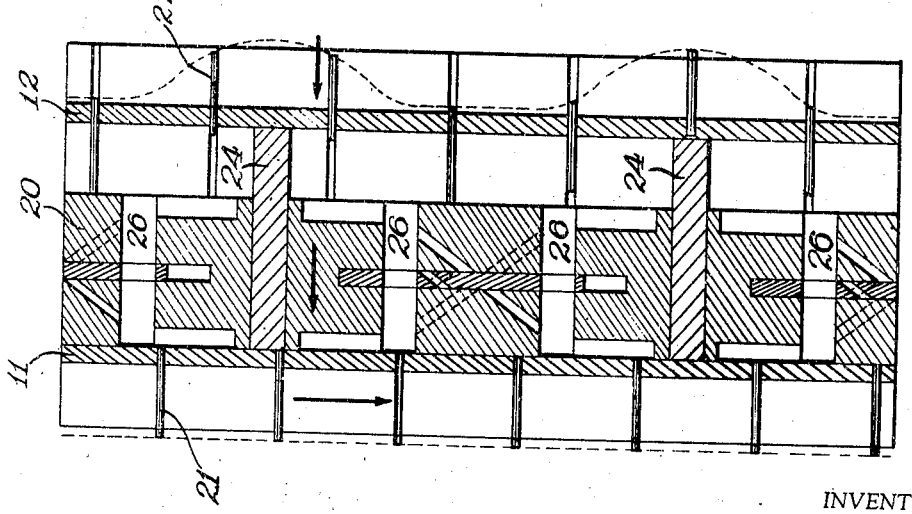

As a further example, if it be assumed that the driving and reaction members are moved through the operation of the lever 30 to the extreme right in Fig. 1, a condition will result as appears from Fig. 15. From this view, it will be noted that the effective volume of the channel 17 has become substantially zero, and consequently devoid of fluid to furnish a motive force. As a result, the transmission is "in neutral" and the driving member will operate idly without transmitting any rotation to the transmission shaft.

It is notable with respect to Fig. 15 that the motive fluid in the various pockets of the channel 18 is entrapped and is not free to circulate in any direction. This is particularly true because of the fact that the slip ring in this position is locking the reaction member against rotation. If this transmission forms a part of an automobile, it is possible therefore by putting the transmission into neutral to lock the car against movement, as, for example, when standing on a hill or in other places where it is desired to effectually preclude movement of the vehicle. It is desirable, however, at times to be able to move a car or other mechanism with which this invention may be associated, and it is for this reason that the slide 58 of Fig. 10 is associated with the lever 59 which is manually adjustable. When it is desired to unlock the parts while in neutral as specified, the lever 59 may be manually adjusted to draw the slide 58 in a downward direction in Fig. 10. This operation will sufficiently loosen the slip ring and draw it back against the adjacent wall 66 (Fig. 1) of the casing, to thereby permit the free movement of the reaction member which will then be susceptible of free conjoint rotation with the filler piece or driven member, so that the car may be readily moved about until the lever 59 has been returned to its normal position.

It is to be noted during the adjustments of the lever 30 with consequent shifting of the driving and reaction members, the movable sections of the cams automatically compensate for the relation of the parts, so that the blades will at all times properly cooperate with the channels with which they are associated. A slight sliding movement, however, between the cams and their mounting rings 32, which I have hereinbefore referred to, is to take up lost motion and wear, and this is accomplished by providing a liquid by-pass 67 (see Fig. 1) between the channel 17 and an annular channel 68 back of the cam, so that there will be practically the same pressure against the back of the cam as is exerted against the end of the blade. The area of this channel 68, however, is such as to produce a slightly greater pressure in the direction of the channel, so as to keep the blades against the ends of the filler member, while the blades are under control of the stationary parts of the cams.

It will be noted in Fig. 1 that I have shown a passage 69 leading into the base of the chamber in the fly wheel. Through this passage I exert a partial vacuum in the pocket formed between the fly wheel and the driving member 11 which vacuum tends to draw the filler member and reaction members to the left, i. e., in a direction to produce a higher ratio of driving speed. However, as hereinbefore stated, the slots 16 which cooperate with the pins 15 to drive the driving member, are inclined to force the parts in the opposite direction, whereby I am able to obtain a substantial balance under normal conditions, i. e., an opposition of forces tending to keep the parts in substantial equilibrium. However, if the load on the transmission shaft is increased as by the car ascending a hill, the power applied through the slots and pins 16—15 becomes greater and overbalances the negative pressure of the partial vacuum sufficiently to force the driving and reaction members to the right in Fig. 1 or in a direction corresponding to a decrease in speed ratio. By this means, I obtain a substantial automatic compensation between load and driving ratio for, as the load decreases, the partial vacuum will exert itself to return the parts to normal balanced position. The partial vacuum may be supplied through a pump or from the intake manifold 75 (Figure 1) or from any other source of minus pressure, or the compensating feature which I have described may be accomplished through the use of centrifugal governors or similar mechanical expedients, as indicated in Figure 17, without departing from this invention.

Figure 16:
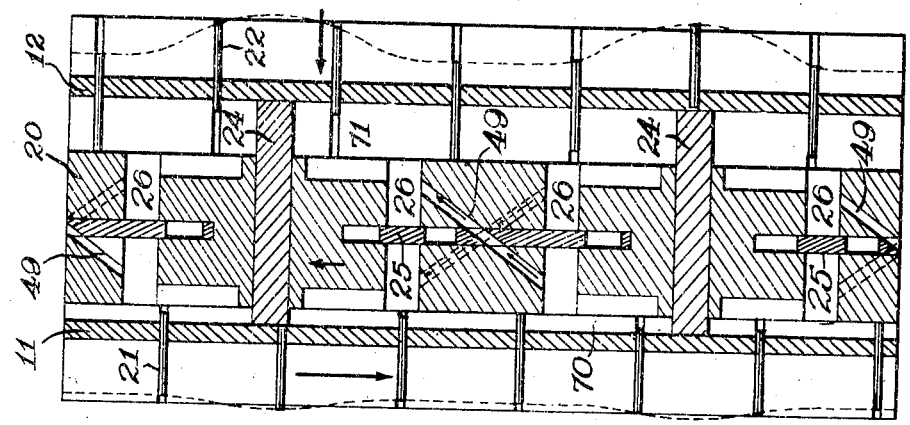

The operations which have hereinbefore been described relate more particularly to drive in a forward direction. If it is desired to operate the transmission of this mechanism in reverse, it is only necessary to manipulate the operating lever 46 to shift the disk valve 22 into reverse position indicated in Fig. 5 and to shift the driving and reaction members into a position of relatively low speed ratio with respect to the driven member, so that the parts will diagrammatically appear as in Fig. 16.

It will be apparent from this figure that the motive fluid in pockets 70 will act in a forward direction against the next preceding partitions with much less exposed area than it will act through the passage 49 and in the pockets 71 against the next preceding abutments and consequently the resulting rotation will be in a retrograde direction.

It will thus be apparent that while the exposed surfaces of the abutments acted upon must be different in reverse, this difference is variable and provides for different speeds in reverse.

It will of course be understood that in the operation of this transmission there will be more or less leakage of the motive fluid, but this is an advantage in that the motive fluid which leaks from the pockets and channels will seep to the bottom of the casing to be drawn through an outlet 72 and pass through a pump 76 or suitable source of supply whence it is returned through the inlet 60. This produces a circulation of the motive fluid with consequent cooling thereof, an advantageous feature of the construction.

In the feeding of the motive fluid through the inlet 60, this is fed at a pressure preferably somewhat lower than the pressure to which the fluid is subjected when operated upon by the blades, but it will be noted from Figs. 3 and 7, that this motive fluid is introduced into the channel 17 through check valves 64 and enters said channel between blades where operating pressure is not present. In this way, an adequate supply of motive fluid is maintained at all times in the channel.

The leakage of motive fluid, i. e., oil during the operation of the transmission, has a further important function in that it fills the chambers 73 at opposite sides of the web 21 of the driven member and this web is provided with constricted passages 74 through which the oil may pass from one chamber 73 to the other, but in a restricted and retarded manner. This arrangement precludes jerky operation in speed changes and offsets a tendency of the driving and reaction members to longitudinally shift from unbalancing forces due to unequal areas. For example, by reference to Fig. 13, it will be noted that the distance between the vane 121 and the next preceding partition is somewhat less than the distance between the vane 122 and the next preceding abutment. Consequently, liquid under pressure in the two corresponding pockets will exert a greater force against the reaction member 12' to move it to the right than against the driving member 11 to move it to the left. Consequently, there will be a tendency of the reaction member 12 to move to the right and carry with it the driving member. This force, however, is only momentary and at an instant later the forces will be just the contrary. This constantly changing variation of forces in opposite directions will be compensated for by the dash pot effect of liquid in the chambers 73 which will cause the parts to act so slowly under the forces stated as to preclude vibration and render them substantially stable in operation.

It will thus be apparent that the present invention provides a relatively simple hydraulic transmission susceptible of an infinite variation in speed which variation may be accomplished manually or automatically or automatically with manual intervention when desired. When operating automatically, the transmission of power appropriate to varying loads is automatically provided for. When operated manually, any desired speed ratio within wide limits and be obtained with an even or steady change. Furthermore, as hereinbefore pointed out, the transmission may be utilized as a brake by placing the transmission substantially in neutral with the slip ring in gripping position.

The structure is self lubricating throughout and embodies a relatively low number of moving parts of rugged construction, which are not apt to get out of order and which will withstand wear for a long period of time without detrimental effects.

It will thus be noted that the present invention embodies numerous novel features over prior attempted achievement in this art. For example, the driving member is power propelled through a positive drive from a prime mover and is provided therein with the channels and associated blades, whereas the filler member is the driven member, the reaction member being also provided with blades. By driving a bladed member from the prime mover, a greater increased efficiency is brought about and furthermore a wide adjustment in speed with the locking in neutral is possible.

It will also be noted that distinct mechanism is provided for controlling reverse operation of the transmission so that a novice in operating this transmission cannot inadvertently operate the same in reverse as a distinct manual operation is necessary in this connection. The blades are moreover positively operated by cams exteriorly of the pockets and thus wear is minimized and the cams which accomplish this result are free flowing in their contours with no sharp corners and no relatively rapid rises or falls between their successive faces.

Another important advantage of the present construction is that the reaction member and the driving member are actually tied together by the direct connection afforded by the cage and anti-friction bearing which I have described and are not dependent for their conjoint cooperation upon the casing to hold them against axial movement away from one another. All of the parts are balanced about the center and cross axial vibration will not occur. Moreover, the parts are such that they may be readily assembled or dismantled when necessary or desirable, so to do, and the arrangement is such that minute adjustments are not necessary after initial installation. The transmission of power through the apparatus of this invention is particularly flexible and smooth without any jerky action whatsoever.

An important practical feature of this invention, moreover, is apparent from Figs. 13—16, inclusive, from which it will appear that whenever the blades are moved by the cams, there is a substantially balanced condition on both sides of the blades. In other words, while they are actually working to force the flow of liquid as described, they travel bodily without any longitudinal movement, i. e., they travel on the flat stationary portion of the cam. It is only after they uncover or extend for at least a portion over one of the straight through passages that the adjustable portion of the cam begins to function and at the same time there is at least a partially balanced condition which rapidly becomes a balanced condition, so that the cams operate the blades under balanced conditions, thus minimizing wear and precluding deformation or the application of undue stresses to the blades or cam mechanism.

I have referred to the smooth, free-flowing coaction of the cam tracks with the blades. In Fig. 4, the movable cam sections 35 are shown as curved somewhat near their ends, but it will be noted from Fig. 2 that the blades engage with the opposite faces of these cam sections. As the cam sections are tilted to a greater or lesser extent, both the faces and the outer peripheries of these cam sections act upon the blades and the shaping of these cam sections is thus as to give a free smooth flowing action to which I have referred. In other words, in the cooperation of the cams and the blades, there is no angular change in direction, but at all times there is that smooth coaction so necessary to noiseless operation and minimum wear.

I have hereinbefore referred to the employment of a motive fluid as the fugitive element in this construction and have specifically mentioned oil by way of example. I wish it understood, however, that other liquids than oil may be employed in this connection and in some cases the motive fluid may be of a gaseous nature, such as air or the like.

The foregoing detailed description sets forth the invention in its preferred practical form, but the invention is to be understood as fully commensurate with the appended claims.

Having thus fully described the invention, what I claim as new and desire to secure by Letters Patent is:

1. In a hydraulic transmission, driving and reaction members arranged coaxially of one another and spaced apart, said members being provided in their adjacent faces with coaxial channels, a driven member positioned coaxially of and between the driving and reaction members and having oppositely extending coaxial annular elements projecting into the channels of the driving and reaction members to close the adjacent open sides of said channels, blades acting through the bases of the channels of both the driving and reaction members for dividing each of the channels into a succession of annularly disposed pockets, at least one partition member carried by the driven member and extending into said channels, said partition member being axially movable with respect to the driven member, means for securing the reaction member against rotation, and means for controlling the movement of said blades in an axial direction.

2. In a hydraulic transmission, driving and reaction members arranged coaxially of one another and spaced apart, said members being provided in their adjacent faces with coaxial channels, a driven member positioned coaxially of and between the driving and reaction members and having oppositely extending coaxial annular elements projecting into the channels of the driving and reaction members to close the adjacent open sides of said channels, blades acting through the bases of the channels of both the driving and reaction members for dividing each of the channels into a succession of annularly disposed pockets, at least one partition member carried by the driven member and extending into said channels, said partition member being axially movable with respect to the driven member, means for securing the reaction member against rotation, and cam means for controlling the longitudinal movement of the blades.

3. In a hydraulic transmission, driving and reaction members arranged coaxially of one another and spaced apart, said members being provided in their adjacent faces with coaxial channels, a driven member positioned coaxially of and between the driving and reaction members and having oppositely extending coaxial annular elements projecting into the channels of the driving and reaction members to close the adjacent open sides of said channels, blades acting through the bases of the channels of both the driving and reaction members for dividing each of the channels into a succession of annularly disposed pockets, at least one partition member carried by the driven member and extending into said channels, said partition member being axially movable with respect to the driven member, means for securing the reaction member against rotation, and cam means operatively connected to the driven member for controlling longitudinal movement of the blades.

4. In a hydraulic transmission, driving and reaction members arranged coaxially of one another and spaced apart, said members being provided in their adjacent faces with coaxial channels, a driven member positioned coaxially of and between the driving and reaction members and having oppositely extending coaxial annular elements projecting into the channels of the driving and reaction members to close the adjacent open sides of said channels, blades acting through the bases of the channels of both the driving and reaction members for dividing each of the channels into a succession of annularly disposed pockets, at least one partition member carried by the driven member and extending into said channels, said partition member being axially movable with respect to the driven member, means for securing the reaction member against rotation, means for controlling the movement of said blades in an axial direction, and means for bodily shifting the driving and reaction members in axial directions as a unit and with respect to the driven member for the purpose of varying the effective depth of the respective channels.

5. In a hydraulic transmission, driving and reaction members arranged coaxially of one another and spaced apart, said members being provided in their adjacent faces with coaxial channels, a driven member positioned coaxially of and between the driving and reaction members and having oppositely extending coaxial annular elements projecting into the channels of the driving and reaction members to close the adjacent open sides of said channels, blades acting through the bases of the channels of both the driving and reaction members for dividing each of the channels into a succession of annularly disposed pockets, at least one partition member carried by the driven member and extending into said channels, said partition member being axially movable with respect to the driven member, means for securing the reaction member against rotation, means for controlling the movement of said blades in an axial direction, means for normally yieldably impelling the driving and reaction members as a unit axially in one direction with respect to the driven member, and normally balanced counteracting means yieldably acting upon said driving and reaction members in a contra axial direction, whereby an increase in load will result in movement of said members in one direction, and a decrease in load will result in movement of said members in the other direction.

6. In a hydraulic transmission, driving and reaction members arranged coaxially of one another and spaced apart, said members being provided in their adjacent faces with coaxial channels, a driven member positioned coaxially of and between the driving and reaction members and having oppositely extending coaxial annular elements projecting into the channels of the driving and reaction members to close the adjacent open sides of said channels, blades acting through the bases of the channels of both the driving and reaction members for dividing each of the channels into a succession of annularly disposed pockets, at least one partition member carried by the driven member and extending into said channels, said partition member being axially movable with respect to the driven member, means for securing the reaction member against rotation, means for controlling the movement of said blades in an axial direction, a prime mover for actuating the driving member, a yieldable connection between the prime mover and the driving member and operable to effect axial movement of the driving and reaction members as a unit in one direction as the load on said members increases, means yieldably acting upon said driving and reaction members and normally tending to move said members in the opposite direction as the load on said members is decreased, whereby the driving and reaction members will normally assume a balanced position for any particular load.

7. In a hydraulic transmission, the combination of coaxial driving and reaction members spaced apart and provided in their adjacent faces with coaxially arranged opposed annular channels, a driven member interposed between the driving and reaction members and having annular projections extending into said channels to close the open sides thereof, at least one partition member carried by the driven member and projecting into at least one of said channels, means for directly connecting the driving and reaction members to one another to preclude their axial movement away from one another while permitting relative rotation between them, means for axially shifting the driving and reaction members as a unit and with respect to the interposed driven member and a plurality of blades operable in each of said channels to divide said channels into a succession of annularly arranged pockets.

8. In a hydraulic transmission, the combination of coaxial driving and reaction members spaced apart and provided in their adjacent faces with coaxially arranged opposed annular channels, a driven member interposed between the driving and reaction members and having annular projections extending into said channels to close the open sides thereof, at least one partition member carried by the driven member and projecting into at least one of said channels, means for directly connecting the driving and reaction members to one another to preclude their axial movement away from one another while permitting relative rotation between them, means for axially shifting the driving and reaction members as a unit and with respect to the interposed driven member, and a plurality of blades operable in each of said channels to divide said channels into a succession of annularly arranged pockets, there being formed between the driven member and the driving member and between the driven member and the reaction member additional substantially closed annular chambers connected to one another through the driven member by constricted passages, said chambers being adapted to contain a liquid which may pass from one chamber to the other in such slow and delayed manner as to steady the relative axial movements between the parts.

9. In a hydraulic transmission, the combination of coaxial driving and reaction members spaced apart and provided in their adjacent faces with coaxially arranged opposed annular channels, a driven member interposed between the driving and reaction members and having annular projections extending into said channels to close the open sides thereof, the adjacent ends of the driving and reaction members being secured to one another with an interposed anti-friction bearing which connection precludes movement of said members apart in an axial direction, but permits relative rotation between them, at least one partition member carried by the driven member and projecting into at least one of said channels, means for axially shifting the driving and reaction members as a unit and with respect to the interposed driven member, and a plurality of blades operable in each of said channels to divide said channels into a succession of annularly arranged pockets.

10. In a hydraulic transmission, the combination of driving and reaction members mounted coaxially with respect to one another for conjoint axial movement and relative rotation and having therein annular channels with blades therein, an interposed driven member cooperating with said driving and reaction members and having at least one partition member projecting into at least one of said channels, braking means cooperating with the reaction member and normally locking the same against rotation, and means operable upon bodily movement of the reaction member in one axial direction to release said braking means and permit the reaction member to freely rotate.

11. In a hydraulic transmission, the combination of driving and reaction members mounted coaxially with respect to one another for conjoint axial movement and relative rotation, an interposed driven member cooperating with said driving and reaction members, a locking ring embracing the reaction member and provided with an interior frusto conical circumference cooperating with and normally gripping a similarly shaped surface on the reaction member, and a stop positioned in the path of said ring to engage therewith when the reaction member is moved axially in one predetermined direction for the purpose of disengaging the ring from the reaction member to permit of free rotation of the latter.

12. In a hydraulic transmission, the combination of driving and reaction members mounted coaxially of one another in spaced apart relation and provided in their adjacent faces with annular channels, a driven member interposed between the driving and reaction members and closing the open sides of said channels, blades operable in the respective channels to divide the same into a succession of annularly arranged pockets, at least one partition element extending through the driven member with its opposite ends projecting into said channels, means for controlling the longitudinal movement of the blades to cause them to clear the partition element when said members are relatively rotated, said driven member being provided with a series of "forward" passages extending therethrough to connect one channel with the other channel, an additional series of "reverse" passages to connect different portions of one channel with different portions of the other channel, and valvular means for selectively permitting the passage of liquid through either series of passages to control a forward or reverse rotation of the driven member.

13. In a hydraulic transmission, the combination of driving and reaction members mounted coaxially of one another in spaced apart relation and provided in their adjacent faces with annular channels, a driven member interposed between the driving and reaction members and closing the open sides of said channels, blades operable in the respective channels to divide the same into a succession of annularly arranged pockets, at least one partition member extending through the driven member with its opposite ends projecting into said channels, means for controlling the longitudinal movement of the blades to cause them to clear the partition when said members are relatively rotated, said driven member being provided with a series of "forward" passages extending therethrough to connect one channel with the other channel, an additional series of "reverse" passages to connect different portions of one channel with different portions of the other channel, and manually operable valvular means for selectively permitting the passage of liquid through either series of passages to control a forward or reverse rotation of the driven member.

14. In a hydraulic transmission, the combination of driving and reaction members mounted coaxially of one another in spaced apart relation and provided in their adjacent faces with annular channels, a driven member interposed between the driving and reaction members and closing the open sides of said channels, blades operable in the respective channels to divide the same into a succession of annularly arranged pockets, at least one partition member extending through the driven member with its opposite ends projecting into said channels, means for controlling the longitudinal movement of the blades to cause them to clear the partition when said members are relatively rotated, said driven member being provided with a series of "forward" passages extending therethrough to connect one channel with the other channel, an additional series of "reverse" passages to connect different portions of one channel with different portions of the other channel, a disk valve positioned cross axially of the driven member to intercept the passages therein and provided with ports to permit selective opening and closing of the passages of each series upon rotation of the disk valve, an axially movable adjusting rod positioned coaxially of the driven member, said rod having a long pitch threaded connection with the disk valve, and means for axially shifting the rod for the purpose of rotating the disk valve to selectively control said passages.

15. In a hydraulic transmission, driving and reaction members arranged coaxially of one another and spaced apart, said members being provided in their adjacent faces with coaxial channels, a driven member positioned coaxially of and between the driving and reaction members and having oppositely extending coaxial annular elements projecting into the channels of the driving and reaction members to close the adjacent open sides of said channels, blades acting through the bases of the channels of both the driving and reaction members for dividing each of the channels into a succession of annularly disposed pockets, at least one partition member carried by the driven member and extending into said channels, said partition member being axially movable with respect to the driven member, and cam means operatively connected to the driven member for controlling longitudinal movement of the blades, said cam means comprising relatively rigid arcuate cam sections axially secured with respect to the driven member and rotatable therewith, and intermediate adjustable cam sections pivoted to the ends of the rigid sections to bridge the arcuate spaces between them, and also pivotably and rotatably secured to the driving and reaction members to be pivotally adjusted with respect to the rigid sections when the driving and reaction members are axially moved, for the purpose of adjusting the throw of the blades to the effective channel depth.

16. In a hydraulic transmission, driving and reaction members arranged coaxially of one another and spaced apart, said members being provided in their adjacent faces with coaxial channels, a driven member positioned coaxially of and between the driving and reaction members and having oppositely extending coaxial annular elements projecting into the channels of the driving and reaction members to close the adjacent open sides of said channels, blades acting through the bases of the channels of both the driving and reaction members for dividing each of the channels into a succession of annularly disposed pockets, at least one partition member carried by the driven member and extending into said channels, said partition member being axially movable with respect to the driven member, and cam means operatively connected to the driven member for controlling longitudinal movement of the blades, said cam means comprising relatively rigid arcuate cam sections axially secured with respect to the driven member and rotatable therewith, and intermediate adjustable cam sections pivoted to the ends of the rigid sections to bridge the arcuate spaces between them, and also pivotably and rotatably secured to the driving and reaction members to be pivotally adjusted with respect to the rigid sections when the driving and reaction members are axially moved, for the purpose of adjusting the throw of the blades to the effective channel depth, said adjustable cam sections being shaped at their ends on smooth sweeping curves tangent to the rigid sections in all relative positions between them.

17. In a hydraulic transmission, driving and reaction members arranged coaxially of and secured to one another in spaced apart relation and against relative axial movement, said members being provided in their adjacent faces with coaxial channels, a driven member positioned coaxially of and between the driving and reaction members and shaped to extend into said channels to close the adjacent open sides of the channels, blades acting through the bases of the channels of both the driving and reaction members, at least one partition member carried by the driving member and extending into the channels, said partition member being axially movable with respect to the driven member, means for imparting relative axial movement between the driving and reaction members as a unit and the driven member to vary the relative effective depths of the channels, and cam means for operating the blades.

18. In a hydraulic transmission, driving and reaction members arranged coaxially of and secured to one another in spaced apart relation and against relative axial movement, said members being provided in their adjacent faces with coaxial channels, a driven member positioned coaxially of and between the driving and reaction members and shaped to extend into said channels to close the adjacent open sides of the channels, blades acting through the bases of the channels of both the driving and reaction members, at least one partition member carried by the driving member and extending into the channels, said partition member being axially movable with respect to the driven member, means for imparting relative axial movement between the driving and reaction members as a unit and the driven member to vary the relative effective depths of the channels, and means for operating the blades.

19. In a hydraulic transmission, driving and reaction members arranged coaxially of one another and spaced apart, said members being provided in their adjacent faces with coaxial channels, a driven member positioned coaxially of and between the driving and reaction members and closing the adjacent open sides of said channels, blades acting through the bases of the channels of both the driving and reaction members for dividing each of the channels into a succession of annularly disposed pockets, at least one partition member carried by the driven member and extending into said channels, means for securing the reaction member against rotation, means for controlling the movement of said blades in an axial direction, a prime mover for actuating the driving member, operative connections between the prime mover and the driving member and operable to effect axial movement of the driving and reaction members as a unit in one direction as the load on said members increases, means acting upon said driving and reaction members and normally tending to move said members in the opposite direction as the load on said members is decreased, whereby the driving and reaction members will normally assume a balanced position for any particular load.

20. In a hydraulic transmission, the combination of driving and reaction members mounted coaxially of one another in spaced apart relation and provided in their adjacent faces with annular channels, a driven member interposed between the driving and reaction members and closing the open sides of said channels, blades operable in the respective channels to divide the same into a successisson of annularly arranged pockets, at least one partition element extending through the driven member with its opposite ends projecting into said channels, and means for controlling the longitudinal movement of the blades to cause them to clear the partition element when said members are relatively rotated.

VLADIMIR AVERIN.